Figure 1:
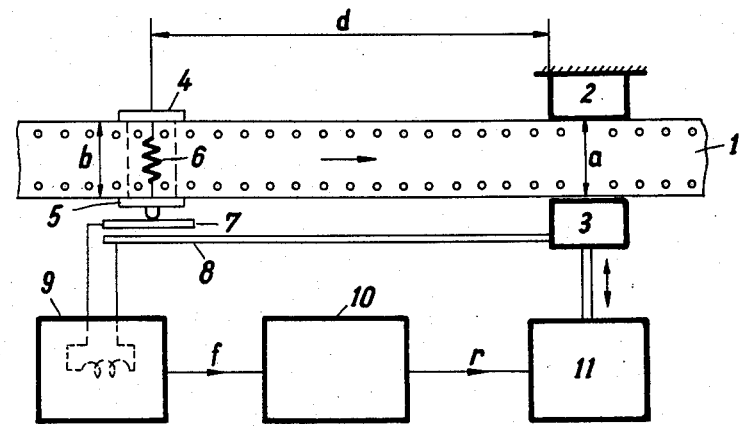

Dec. 17, 1963  E. LEGLER  3,114,489
CINEMATOGRAPHIC FILM TRANSPORT APPARATUS
Filed Dec. 16, 1960  2 Sheets-Sheet 1

Inventor:
ERNST LEGLER
BY
Michael S. Striker
his ATTORNEY

Dec. 17, 1963 E. LEGLER 3,114,489
CINEMATOGRAPHIC FILM TRANSPORT APPARATUS
Filed Dec. 16, 1960 2 Sheets-Sheet 2

Inventor:
ERNST LEGLER
BY
Michael S. Striker
his ATTORNEY

United States Patent Office 3,114,489
Patented Dec. 17, 1963

3,114,489
CINEMATOGRAPHIC FILM TRANSPORT
APPARATUS
Ernst Legler, Darmstadt, Germany, assignor to Fernseh
G.m.b.H., Darmstadt, Germany
Filed Dec. 16, 1960, Ser. No. 76,323
13 Claims. (Cl. 226—3)

The present invention relates to a cinematographic film transport apparatus and is especially concerned to movable guiding means for restricting the lateral movement of the film.

In the hitherto used cinematographic film transport apparatus there was always within the projection window or gate some lateral movement of the film. This lateral movement of the film is rather disturbing when the film is passing the gate of a film camera or of a film projector but is especially disadvantageous when the film passing the gate is scanned there for the purpose of television transmission.

It is an object of the invention to provide better methods and means for guiding the film within the gate so that the aforesaid mentioned difficulties due to the lateral movement of the film will be avoided.

It is a further object of the invention to provide special sensing means engaging the film at a point prior to its entry into the projecting window and to vary an electrical magnitude, e.g. a voltage in accordance with changes in the width of said film and to vary the distance of the lateral guide members according to the width of the film measured by said sensing means.

It is another object of the invention to provide special delay circuits between said sensing means and said movable guiding means so that the delay is greater when the width of the film is decreasing and the delay is smaller when the width of the film is increasing.

It is a still further object of the invention to provide a special frequency discriminator circuit arrangement for developing a control voltage of which the amplitude and polarity vary in accordance with the magnitude and direction of the discrepancy between the frequency of an observed voltage and a predetermined frequency. In control arrangements in which the magnitude of the control voltage depends upon the frequency of an observed signal it is often desired that on the one hand the control slope in the region of the nominal frequency is high, and on the other hand that a controlling effect shall still be produced even for large departures of the observed signal from its nominal value. These requirements, which appear to be inconsistent with one another, are not fulfilled by the known discriminators. For they possess a wide working range with corresponding small control slope, or an increase of the control slope must be purchased with a reduction of the working range.

The discriminator which is described below does not show the aforesaid disadvantages and is therefore especially useful for a cinematographic film transport apparatus with movable guide means.

Figure 4:
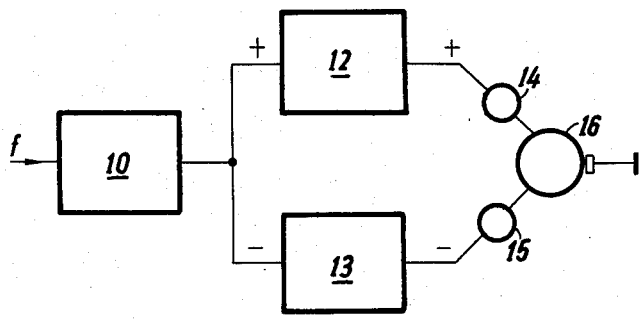
Figure 2:
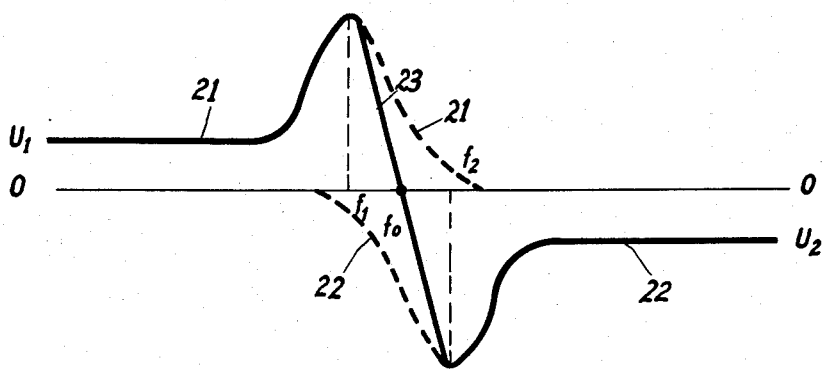
Figure 3:
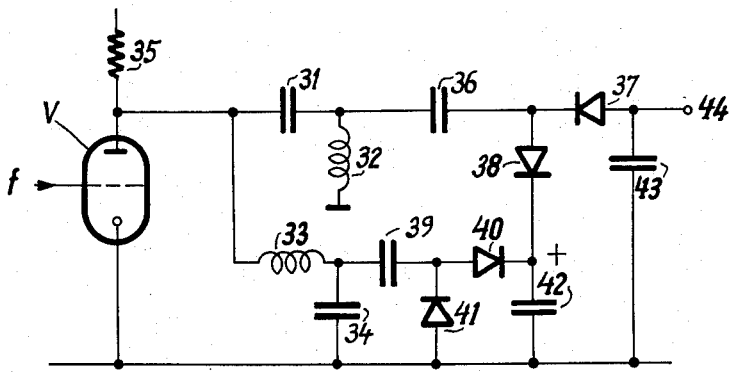

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings comprising FIGURES 1 to 4 of which:

FIGURE 1 shows schematically an embodiment of the invention for automatic control of the lateral guide for a film in accordance with the width of the film, FIGURE 2 is a graph showing the derivation of the frequency characteristic of a discriminator according to the invention, FIGURE 3 shows the circuit diagram of one practical embodiment of discriminator circuit arrangement according to the invention, FIGURE 4 is a schematic illustration of an extension of the invention as applied in the manner described in relation to FIGURE 1.

FIGURE 1 shows the block diagram of a control arrangement for adapting a film guide to the width of the length of film. In order to avoid lateral shifting of the film during its passage through the recording or reproducing device and the fluctuations in picture register associated therewith, the film 1 passes through a guide device composed of a fixed guide 2 and a movable guide 3, which abut the edges of the film. The film should on the one hand pass practically without lateral play between the guides and on the other hand must not bind in the guide. As long as the film has a width which remains constant, this requirement may be fulfilled by mechanical adjustment of the movable guide 3. It has been found in practice that the separation of the guide cheeks must match the width of the film within a tolerance of 0.005 mm., or 5 microns. The exact value of the width of the film is somewhat different for each length of film owing, among other reasons, to varyingly great shrinkage of the film base. Even in one and the same length of film the width may vary by a considerably greater amount than the allowable tolerance, owing to varying amounts of shrinkage and manufacturing tolerances. Particularly large differences appear, for example, when two different lengths of film are spliced together and run through the device in succession. Abrupt alterations in the width of up to 0.2 mm., for example, may then appear. While gradual alterations in the width of the film may possibly be accommodated by manual adjustment of the guide 3, this is no longer possible in the case mentioned just above, and on the introduction of the wider length of film into the guide the film would bind and break. If the width of the film suddenly decreases, then the film will run rather loosely through the guide members in the gate and vary its lateral position within the gate in an irregular manner.

In a control circuit arrangement for automatic readjustment of the movable guide in accordance with the width of the film it is now possible to effect the readjustment with sufficient accuracy and speed. For this purpose the width of the lengths of film is measured at a distance $d$ in front of the film guide 2, 3 and from the measured value $b$ there is derived a controlling voltage which alters the separation $a$ of the guide-cheeks 2, 3 to the measured width of the film with the necessary rapidity. The measurement may be effected, for example, by means of a film guide-roll having a fixed flange 4 and an axially movable flange 5, which is urged towards the fixed flange 4 by means of a spring 6, so that the film runs without play between the flanges 4 and 5.

The movement of the flange 5 as the width of the film alters is now transmitted to a metal plate 7, which forms the moving plate of a variable capacitor, the fixed plate of which is shown at 8. This capacitor is connected as the frequency-determining element in the oscillatory circuit of an oscillator 9. The output frequency $f$ of oscillator 9 thus varies in accordance with the capacitance of the capacitor 7, 8 and thus in accordance with the width of the film. By choosing a small distance between the condenser plates 7, 8 and a high frequency of oscillation it may be arranged that even very small alterations in the separation of the plates result in considerable alterations of frequency. For example, with a mean separation of the condenser plates of 0.3 mm. and a mean oscillator frequency of 40 mc./s., a frequency change of 250 c./s. is produced for an alteration of the film width within the tolerance of 5 microns. As previously stated, however, alterations of up to 0.2 mm. in the width of the film may appear, which produce alterations of frequency up to 10 mc./s.

The alternating voltage supplied by oscillator 9 is fed to the discriminator 10. In the novel discriminator according to the invention the contradictory requirements of steep control slope at small frequency deviation (from the normal value) and of producing a useful control voltage also at considerable frequency deviation are both met. This is done by applying the observed voltage alike to a low-pass and to a high-pass filter, the cutoff frequencies of which lie respectively below and above the nominal frequency, individual rectifiers fed respectively with the output signals from said low-pass and high-pass filters and yielding direct output voltages proportional in amplitude to the magnitudes of said output voltages and combining said direct output voltages in opposed polarity to yield said control voltage.

By appropriate choice of the cutoff frequencies of the two filters, their frequency characteristics may be given forms such that a steep control characteristic is produced in the neighbourhood of the nominal frequency, so that for even small deviations of the observed signal from the nominal frequency a large control voltage in one sense or the other is developed. Since a voltage of one or the other polarity appears at the output of the filters even for a large departure of the observed signal from the nominal frequency, a discriminator according to the invention supplies a control voltage of the correct sense even when the departure from the nominal value is extreme.

The control voltage $r$ derived from the discriminator may, after appropriate amplification, actuate the control device 11 which sets the position of the movable guide-cheek 3.

In FIGURE 2 the curve 21 is a graph showing the direct voltage which results from the rectification of the output voltage of the low-pass filter in a discriminator circuit arrangement according to the invention, plotted against frequency. Curve 22 is the corresponding curve for the high-pass filter. The resonant peak which marks the cutoff frequency $f_1$ of the low-pass filter lies somewhat below the nominal frequency $f_0$, while the resonant peak which marks the cutoff frequency $f_2$ of the high-pass filter lies somewhat above the nominal frequency $f_0$. If the two voltages represented by the curves 21 and 22 are combined in opposite polarity, as they are illustrated, then there results the curve 23, which shows the output characteristic of the discriminator. At the nominal frequency $f_0$ the output voltage of the discriminator is thus zero. In the neighbourhood of the nominal frequency large output voltages result even for small deviations of the observed signal from the nominal value, the output voltage being, for example, positive when the frequency is less than the nominal frequency and negative when the frequency is greater than the nominal. In the region of the nominal frequency the characteristic 23 exhibits a high slope which is substantially greater than that of either the high-pass filter 22 or of the low-pass filter 21 alone. In addition the characteristic 23 is approximately linear over this range.

In contradistinction to the known discriminators, the discriminator according to the invention delivers an output voltage in the correct sense even for very large deviations of the observed signal from the nominal value.

As the frequency of the observed signal becomes less than the nominal value, although the component of the output voltage developed by the high-pass filter becomes zero, the component arising from the low-pass filter attains a constant value $U_1$, which remains even down to zero frequency. In a similar manner the discriminator delivers, even for frequencies substantially higher than the nominal frequency, an output voltage $U_2$ in the opposite sense, which theoretically persists up to an infinitely high frequency. When the discriminator is used in a frequency-dependent control arrangement it is therefore ensured that even for arbitrarily large departures of the frequency from the nominal value a control voltage is produced and control is thus effected, while on the other hand small departures from the nominal value give rise to large alterations of the control voltage and the control therefore operates with greater accuracy in this range.

FIGURE 3 shows by way of example one embodiment of a discriminator circuit according to the invention. The alternating voltage of variable frequency which constitutes the signal to be observed is fed on the one hand to a high-pass filter and on the other hand to a low-pass filter. In the simplest case, which is that illustrated, the high-pass filter consists of a capacitance 31 as series element and an inductor 32 as shunt element, while the low-pass filter is formed by an inductance 33 as series element and a capacitor 34 as shunt element. It is obvious that many other arrangements well-known in filter technique and having the required high-pass and low-pass characteristics respectively may be used in these positions to replace the simple filters illustrated, while still obtaining the required frequency characteristic.

As the source of the alternating signal voltage there may, for example, be employed an amplifier stage including a valve V, to the anode load resistor 35 of which the high-pass and low-pass filters are connected in parallel and to the control grid of which the variable-frequency signal is applied. The alternating voltages passed by the high-pass and low-pass filters are rectified by peak rectifiers. These consist of the diodes 37, 38 and 40, 41 respectively which are connected by way of the capacitors 36 and 39 respectively to the outputs of the filters. The rectifiers 37 and 40 are oppositely poled. On the smoothing capacitor 42 of the rectifier 40 there appears, for example, a positive voltage, while the rectifier 37 supplies a negative voltage. The output voltages of the two rectifiers are connected in series so that on the smoothing capacitor 43 bridging the two rectifiers, and therefore at the output terminal 44 of the discriminator, there appears the difference of the two rectified voltages, the variation of which with frequency corresponds to the curve 23 of FIGURE 2. The resistance 35 is so chosen that the frequency characteristics of the low- and high-pass filters exhibit a considerable rise at the frequencies $f_1$ and $f_2$ respectively.

By using a discriminator according to the invention it is now possible to effect the readjustment of the guide cheek 3 within the small tolerance of 5 microns and on the other hand to obtain equalization of a very much greater alteration of film width. The control voltage $r$ derived from the discriminator may, after appropriate amplification, actuate the control device 11 which sets the position of the movable guide-cheek 3. This control device contains an electric motor which runs in one or the other direction according to the polarity of the control voltage and through the intermediary of an appropriate mechanical drive adjust the movable guide-cheek 3 in one direction or the other. At the same time the position of the nominally fixed plate 8 of the capacitor 7, 8, which is mechanically coupled to the guide 3, is altered. The frequency of the oscillator is thus likewise altered, until this frequency again falls within the steep portion of the discriminator characteristic. Thus even with widely varying width of the film control is always effected with the necessary accuracy, whatever the actual film width.

Since the control process requires a certain finite time for its completion, the control operation should be completed before the part of the film, the passage of which through the measuring roll produced the operation, reaches the guide. But the moment, at which the control process should be completed is depending from the direction of the control process, i.e. whether the width of the film is decreasing or increasing. If, for example, the width of the film at the measuring roll suddenly increases owing to the passage of a splice, then as the splice enters the film guide, the distance *a* between the guide cheeks must have already been adapted to the greater width of the film, and the control process thus completed, otherwise the film will become jammed between the guiding members and break. Therefore the control process must begin so much earlier in respect to said moment as the process itself is lasting. During the actual control process the narrower film is still passing through the guide and during that time will be only loosely guided. Therefore the duration of the control process itself should be as short as possible.

The case is different when the film width is suddenly reduced, again for example owing to a splice. In this case the control operation must commence only when the splice has already completely traversed the guide.

For different senses of changes of the film width the control process therefore should begin at different moments; it should begin earlier when the width of the film is increasing and later when the width is decreasing.

According to an extension of the invention the discriminator arrangement is modified so that an output voltage is developed only after a predetermined voltage corresponding to the allowable tolerance is attained and that this control voltage comes into play with different time delays according to its direction, or polarity. Such an arrangement is schematically illustrated in FIGURE 4. The output voltage supplied by the discriminator 10 only effects the readjustment of the guide cheek 3 by means of the motor 16 when it has attained a certain minimum magnitude, and moreover comes into effect only when a certain time has elapsed after reaching this threshold value, the time delay being different for the different polarities of the control voltage.

If the output voltage of the discriminator reaches the threshold value corresponding to the allowable tolerance in the positive direction, then the delay device 12 takes effect, yielding a positive control voltage for the motor only after the expiry of its appropriate delay period. For a negative-going output voltage from this discriminator another delay device 13 comes into effect, yielding the negative control voltage for the motor only after the expiry of its delay time. The delay devices 12 and 13 may, for example, contain sawtooth generators, of which the stroke commences when the threshold value is reached and which provide an output voltage only when the sawtooth voltage has attained a definite value. The time-delays may be adjusted to the required values by appropriate design of the sawtooth generators, the two time delays being quite independent of one another. The output voltages of the delay devices 12 and 13 pass by way of the unidirectionally conductive devices 14 and 15 to the motor 16. These unidirectionally conductive devices, which may for example be formed by transistors, ensure that the motor can be fed only with a positive or with a negative voltage from the delay devices.

What is claimed as new and desired to be secured by Letters Patent is:

1. A method for adjusting guide means of variable spacing in accordance with varying widths of a film moving through the guide means, comprising the steps of: monitoring the width of the moving film at a point of its path before it enters the guide means; producing a control signal having a characteristic depending upon the monitored width of the film at said point; and adjusting the spacing of the guide means depending upon said control signal to a value corresponding to said monitored width of the film.

2. A method for adjusting guide means of variable spacing in accordance with varying widths of a film moving through the guide means, comprising the steps of: monitoring the width of the moving film at a point of its path before it enters the guide means; producing a control signal having a characteristic depending upon the monitored width of the film at said point; and adjusting the spacing of the guide means depending upon said control signal to a value corresponding to said monitored width of the film with variable time factors in such a manner that when the monitored width of the film is increasing from a preceding monitored value the adjustment is completed before the increased width portion of the film reaches the guide means, while when the monitored width of the film is decreasing from a preceding monitored value the adjustment is started only after the decreased width portion of the film has passed the guide means.

3. A method for adjusting guide means of variable spacing in accordance with the varying widths of a film moving through the guide means, comprising the steps of: monitoring the width of the moving film at a point of its path before it enters the guide means; producing a control signal having a characteristic depending upon an existing difference between the actual spacing of the guide means and the monitored width of the film at said point; and adjusting the spacing of the guide means depending upon said control signal to a value corresponding to said monitored width of the film.

4. A method for adjusting guide means of variable spacing in accordance with the varying widths of a film moving through the guide means, comprising the steps of: monitoring the width of the moving film at a point of its path before it enters the guide means; producing a control signal having a characteristic depending upon an existing difference between the actual spacing of the guide means and the monitored width of the film at said point; and adjusting the spacing of the guide means depending upon said control signal to a value corresponding to said monitored width of the film with variable time factors in such a manner that when the monitored width of the film is increasing from a preceding monitored value the adjustment is completed before the increased width portion of the film reaches the guide means, while when the monitored width of the film is decreasing from a preceding monitored value the adjustment is started only after the decreased width portion of the film has passed the guide means.

5. A method for adjusting guide means of variable spacing in accordance with the varying widths of a film moving through the guide means, comprising the steps of: monitoring the width of the moving film at a point of its path before it enters the guide means; producing a control voltage having a characteristic depending upon an existing difference between the actual spacing of the guide means and the monitored width of the film at said point; and adjusting the spacing of the guide means depending upon said control voltage to a value corresponding to said monitored width of the film in such a manner that the adjustment is started only after said control voltage has reached a predetermined value.

6. In a cinematographic film transport apparatus, in combination, means for moving the film longitudinally; guide means including guide members spaced from one another in transverse direction of the film and simultaneously engaging during operation respectively opposite edges of the film so as to restrict lateral movement thereof, said guide members being mounted movably relative to one another so as to permit variation of their relative spacing; sensing means engaging said edges of said film at a point thereof located a predetermined distance from said guide means in direction opposite to the movement of the film for monitoring the width of the moving film at said point and including circuit means for furnishing a control signal in accordance with varying widths of the film as sensed by said sensing means; and control means responding to said control signal by varying said spacing of said guide members.

7. In a cinematographic film transport apparatus, in combination, means for moving the film longitudinally; guide means including guide members spaced from one another in transverse direction of the film and simultaneously engaging during operation respectively opposite edges of the film so as to restrict lateral movement thereof, one of said guide members being mounted stationarily, the other guide member being mounted movably relative to the other guide member so as to permit variation of their relative spacing; sensing means engaging said edges of said film at a point thereof located a predetermined distance from said guide means in direction opposite to the movement of the film for monitoring the width of the moving film at said point and including circuit means for furnishing a control signal in accordance with varying widths of the film as sensed by said sensing means; and control means responding to said control signal by varying said spacing of said guide members.

8. In a cinematographic film transport apparatus, in combination, means for moving the film longitudinally; guide means including guide members spaced from one another in transverse direction of the film and simultaneously engaging during operation respectively opposite edges of the film so as to restrict lateral movement thereof, one of said guide members being mounted stationarily, the other guide member being mounted movably relative to the other guide members so as to permit variation of their relative spacing; sensing means engaging said edges of said film at a point thereof located a predetermined distance from said guide means in direction opposite to the movement of the film for monitoring the width of the moving film at said point and including means for varying an electrical value in accordance with varying widths of the film as sensed by said sensing means, and circuit means for furnishing a control signal with a varying characteristic depending upon variations of said electrical value; and control means responding to said control signal by varying said spacing of said guide members.

9. In a cinematographic film transport apparatus, in combination, means for moving the film longitudinally; guide means including guide members spaced from one another in transverse direction of the film and simultaneously engaging during operation respectively opposite edges of the film so as to restrict lateral movement thereof, one of said guide members being mounted stationarily, the other guide member being mounted movably relative to the other guide member so as to permit variation of their relative spacing; sensing means engaging said edges of said film at a point thereof located a predetermined distance from said guide means in direction opposite to the movement of the film for monitoring the width of the moving film at said point and including variable capacitor means and means for varying the capacity of said capacitor means in accordance with varying widths of the film as sensed by said sensing means, and circuit means for furnishing a control signal with a varying characteristic depending upon variations of the capacity of said capacitor means, said circuit means comprising oscillator means, said variable capacitor means constituting the frequency-determining element for said oscillator means, for furnishing an alternating voltage of a frequency varying with the variation of said capacitor means, and discriminator means for comparing the frequency of said alternating voltage with a preselected reference frequency and for producing accordingly said control signal; and control means responding to said control signal by varying said spacing of said guide members.

10. An arrangement as claimed in claim 9, wherein said sensing means comprise a guide roll having a fixed flange and an axially movable flange engaging the film edgewise between themselves, biasing means for urging said movable flange toward engaging the film, and wherein said variable capacitor means comprise a first plate member operatively connected with said movable flange so as to follow any axial movement of the latter, and a second plate member spaced from said first plate member and connected with said movably mounted guide member for being moved toward and away from said first plate member as the spacing between said guide members varies, so that the spacing between said first and second plate members of said capacitor means varies corresponding to a variation of a difference between the width of the film existing at a given moment between said guide members and the width of the film existing simultaneously between said flanges of said guide roll.

11. An arrangement as claimed in claim 10, wherein said discriminator means comprise a high-pass filter having a resonant frequency higher than said preselected reference frequency, and a low-pass filter having a resonant frequency lower than said reference frequency, the input ends of said high-pass filter and low-pass filter, respectively, being connected in parallel with the output end of said oscillator means, first rectifier means being connected to the output end of said high-pass filter for delivering a direct current voltage of one polarity, and second rectifier means being connected to the output end of said low-pass filter for delivering a direct current voltage of opposite polarity, said rectifier means being connected in cascade so as to furnish said control signal as the difference between said direct current voltages of respectively opposite polarities.

12. An arrangement as claimed in claim 11, wherein said circuit means further comprise first delay means connected with said first rectifier means and being actuated only by said direct current voltage of one polarity, and second delay means connected with said second rectifier means and being actuated only by said direct current voltage of said opposite polarity, said first delay means delaying the delivery of a control signal having one polarity to such a degree that the variation of the spacing between said guide members in response to said control signal is completed before the point of the moving film which gives rise to said control signal has reached said guide means, said second delay means delaying the delivery of a control signal having said opposite polarity to such a degree that the variation of the spacing between said guide members in response to said control signal of opposite polarity is started only after the point of the moving film which gives rise to said control signal has passed between said guide means.

13. An arrangement as claimed in claim 12, wherein each of said delay means comprises a saw-tooth voltage generator means starting the rising phases of such saw-tooth voltages in response to the output voltage of said discriminator means and furnishing said control signal when the respective saw-tooth voltage has reached a predetermined value.

References Cited in the file of this patent
UNITED STATES PATENTS

| | | |
|---|---|---|
| 1,678,925 | Tackaberry | July 31, 1928 |
| 2,287,768 | Eckstein | June 30, 1942 |
| 2,308,985 | Krieger | Jan. 19, 1943 |
| 2,731,262 | Morrow | Jan. 17, 1956 |
| 2,737,386 | Reher | Mar. 6, 1956 |

FOREIGN PATENTS

| | | |
|---|---|---|
| 209,840 | Austria | June 25, 1960 |